(12) United States Patent
Jun et al.

(10) Patent No.: US 7,935,170 B2
(45) Date of Patent: May 3, 2011

(54) METHOD FOR MANUFACTURING COPPER-BASED NANOPARTICLES

(75) Inventors: Byung-Ho Jun, Seoul (KR); Jae-Woo Joung, Suwon-si (KR); Joon-Rak Choi, Incheon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 763 days.

(21) Appl. No.: 11/987,162

(22) Filed: Nov. 28, 2007

(65) Prior Publication Data
US 2010/0282022 A1 Nov. 11, 2010

(30) Foreign Application Priority Data
Sep. 28, 2007 (KR) .................. 10-2007-0098392

(51) Int. Cl.
*B22F 9/24* (2006.01)
(52) U.S. Cl. .......................... 75/373; 977/896
(58) Field of Classification Search .................. None
See application file for complete search history.

(56) References Cited

U.S. PATENT DOCUMENTS

| | | | |
|---|---|---|---|
| 6,746,510 B2 * | 6/2004 | Kurihara et al. | 75/345 |
| 6,951,666 B2 * | 10/2005 | Kodas et al. | 427/376.6 |
| 7,591,872 B1 * | 9/2009 | Jun et al. | 75/371 |
| 7,611,644 B2 * | 11/2009 | Shim et al. | 252/500 |
| 2006/0254387 A1 * | 11/2006 | Lee et al. | 75/252 |
| 2007/0140951 A1 * | 6/2007 | O'Brien et al. | 423/592.1 |
| 2008/0124268 A1 * | 5/2008 | Yang et al. | 423/511 |
| 2008/0245186 A1 * | 10/2008 | Yang et al. | 75/362 |

FOREIGN PATENT DOCUMENTS
KR 10-2006-0135302 12/2006

OTHER PUBLICATIONS

Korean Office Action issued in Korean Patent Application No. KR 10-2007-0098392, dated May 29, 2009.

* cited by examiner

*Primary Examiner* — George Wyszomierski
(74) *Attorney, Agent, or Firm* — McDermott Will & Emery LLP

(57) ABSTRACT

The present invention relates to a method for manufacturing copper-based nanoparticles, in particular, to a method for manufacturing copper-based nanoparticles, wherein the method includes producing CuO nanoparticles by mixing CuO micropowder and alkylamine in a nonpolar solvent and heating the mixture at 60-300° C.; and producing copper-based nanoparticles by mixing a capping molecule and a reducing agent with the CuO nanoparticles and heating the mixture at 60-120° C.

According to the present invention, copper-based nanoparticles can be synthesized using CuO, but not requiring any inorganic reducing agent, in a high yield and a high concentration, so that it allows mass production and easy controlling to desired oxidation number of nanoparticles.

11 Claims, 2 Drawing Sheets

METHOD FOR MANUFACTURING COPPER-BASED NANOPARTICLES

CROSS-REFERENCE TO RELATED APPLICATIONS

This application claims the benefit of Korean Patent Application No. 10-2007-0098392 filed on Sep. 28, 2007, with the Korea Intellectual Property Office, the contents of which are incorporated here by reference in their entirety.

BACKGROUND

1. Technical Field

The present invention relates to a method for manufacturing copper-based nanoparticles, more particularly, to a method for manufacturing copper-based nanoparticles whose oxidation number and size can be controlled and which can be produced in mass.

2. Description of the Related Art

In response to demands for electronic components with miniaturization and high-densification, needs for metal patterning in a thin film using inkjet or formation of microwiring on a substrate have been increased. To implement this, it is necessary to produce conductive ink which is made from nano size of copper particles having a uniform shape, a narrow distribution of particles and an excellent dispersibility.

There are various methods of producing copper nanoparticles, such as mechanical grinding method, co-precipitation method, spray, sol-gel method, electro-deposition method, and microemulsion method, etc. In case of producing metal nanoparticles by the co-precipitation method widely used, it is impossible to control size, shape, size distribution of particles. In case of producing by the electro-deposition method and sol-gel method, it is difficult to produce in mass production and production cost is high. Also, in case of producing by the microemulsion method, it is easy to control size, shape, size distribution of particles, however, it is not suitable for practical use as the production process is complicated.

Recently, a copper nanoparticle synthetic method using solution synthesis has been suggested. Conventional nanoparticle synthetic methods using solution synthesis are, for example, thermal decomposition method and reduction method. In case of thermal decomposition method of Cu nanoparticles requires high cost since it uses expensive precursor such as $[Cu(u\text{-}mesitil)_5]$ or $Cu(acac)_2$.

As methods of preparing copper nanoparticles with the size less than several tens of nm, TDMA (thermal decomposition of metal acetate) suggested by O'Brein et al. has been well-known. This method is a thermal decomposition of metal acetates such as $Mn(CH_3CO_2)_2$, $Cu(CH_3CO_2)$ in an oleic acid, in which the oleic acid functions as a solvent and a capping molecule. In case of copper nanoparticles, the example using trioctylamine simultaneously was published in J. Am. Chem. Soc. 2005. Also, Hyeon group published that copper particle synthesis using the thermal decomposition of copper acetyloacetate $(Cu(acac)_2)$ in oleylamine. These methods are examples that use the high temperature thermal decomposition in solution.

Recently, methods for manufacturing copper nanoparticles using the thermal decomposition have been reported after designing a copper precursor using the CVD precursor design technique (KR Patent No. 10-2005-35606). It has an advantage that copper nanoparticles can be synthesized by the thermal decomposition at a low temperature of less than 200° C. It, however, requires a new precursor design and high manufacturing costs.

Also, to synthesize copper nanoparticles using reduction method, a reducing agent is added using micelle method. However, in case of the micelle method, the concentration of an available copper precursor is low, thus synthesis with high concentration cannot be achieved. Also, homogenous nucleation is impossible as the reducing agent is added and productivity is low as growth rate cannot be controlled.

The above methods have problems that the reaction cannot be processed uniformly in case of using more than a certain amount, since thermal decomposition is rapidly performed by injecting a certain amount of all precursors at the same time which are used in the synthesis, or metal nitride or metal salt which are used in the synthesis are reduced using an organic reducing agent.

Therefore, a method for manufacturing copper nanoparticles having high concentration and uniform size is demanded.

SUMMARY

The present invention was accomplished taking into account of the problems as described above. The present invention provides a method for manufacturing copper-based nanoparticles including: producing CuO nanoparticles by mixing CuO micropowder and alkylamine in a nonpolar solvent and heating the mixture at 60-300° C.; and producing copper-based nanoparticles by mixing a capping molecule and a reducing agent with the CuO nanoparticles and heating at 60-120° C.

Here, the copper-based nanoparticle is selected from a group consisting of $Cu_2O$; Cu and a mixture thereof.

According to an embodiment of the invention, the method may further include: isolation of the copper-based nanoparticles using methanol or acetone.

According to an embodiment of the invention, the alkylamine is mixed in a mole of 2 to 10 with respect to 1 mole of the CuO micropowder.

According to an embodiment, of the invention, the alkylamine is a primary amine. Here, the primary amine is an alkylamine having carbon numbers of 4 to 18. Also, here, the alkylamine having carbon numbers of 4 to 18 is at least one selected from a group consisting of butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine and octadecylamine.

Here, the capping molecule is mixed in a mole of 0.5 to 4 with respect to 1 mole of CuO micropowder. Here, the capping molecule is oleic acid Here, the nonpolar solvent is at least one selected from a group consisting of toluene, hexane, cyclohexane, decane, dodecane, tetradecane, hexadecane, octadecane and octadecene.

Here, the nonpolar solvent is mixed in a mole of 3 to 30 with respect to 1 mole of the CuO micropowder.

Here, the reducing agent is formic acid.

Here, the reducing agent is mixed in a mole of 1 to 10 with respect to 1 mole of the CuO micropowder.

Additional aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION

Figure 1:
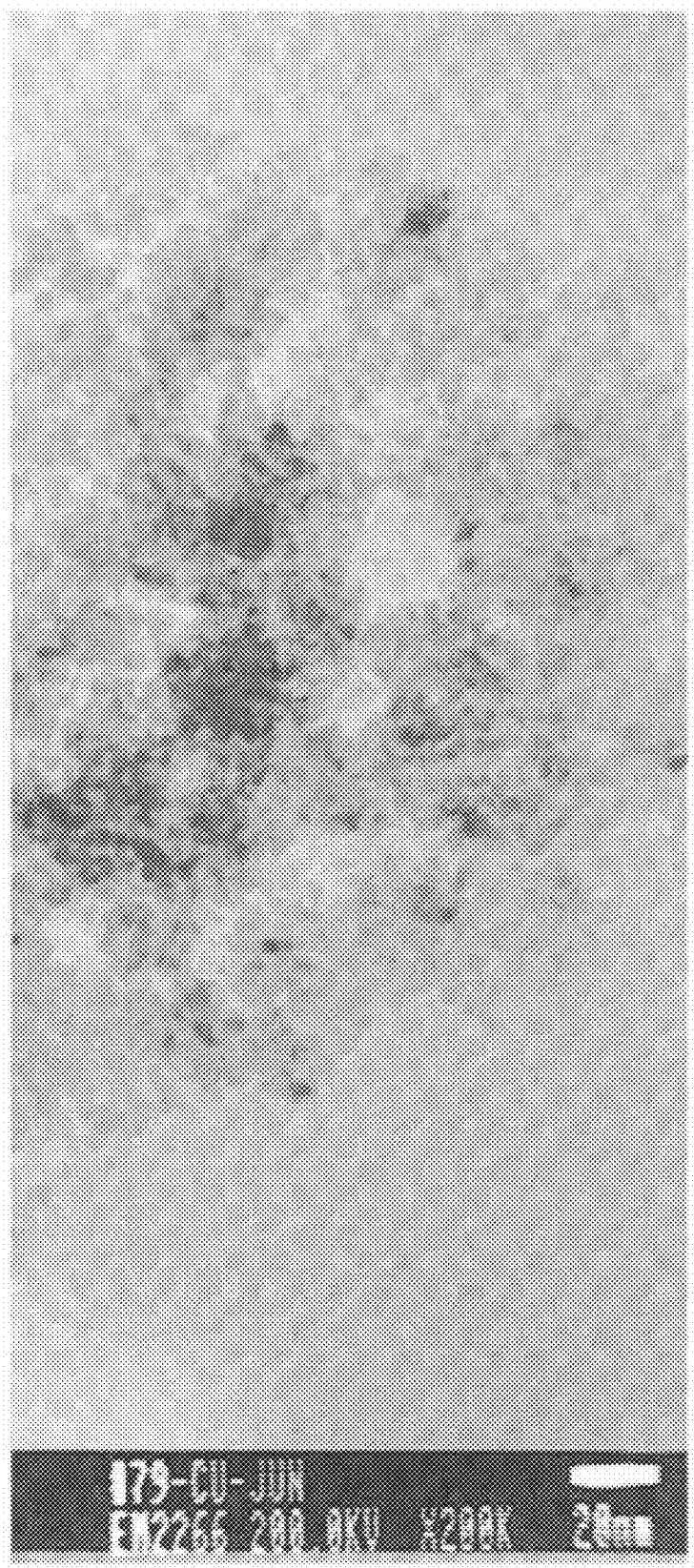
FIG. 1 is a TEM image of the CuO nanoparticles manufactured according to example 1 of the invention.

Hereinafter, preferred embodiments will be described in detail of the method for manufacturing copper-based nanoparticles according to the present invention.

The present invention relates to a method for manufacturing copper-based nanoparticles such as $Cu_2O$ or Cu, in which copper salts or copper nitrides that are generally used in manufacturing metal nanoparticles as a precursor are not used so that there is no formation of salt or nitrogen and any inorganic reducing agent such as $NaBH_4$, $KBH_4$, $(CH_3)N-BH_3$, $NaHPO_2$ is not used so that there is no inorganic compound except Cu after the reaction is completed and thus purity of copper and copper oxide is maintained. Also, it can control explosiveness that is induced by using a very high reactive inorganic reducing agent.

In the present invention, the CuO micropowder has size of 100 nm-10 μm, it is manufactured in Samchun chemical Inc., Aldrich Inc., etc and easily obtained.

More specifically, the present invention includes; producing CuO nanoparticles by mixing CuO micropowder and alkylamine in a nonpolar solvent and heating the mixture at 60-300° C.; and producing copper-based particles by mixing a capping molecule and a reducing agent with the CuO nanoparticles and heating the mixture at 60-120° C.

In the method for manufacturing $Cu_2O$ and Cu nanoparticles from CuO micropowder, with respect to 1 mole of CuO nanoparticle, nanoparticles of desirable oxidation number (+2, +1, 0) can be manufactured by controlling reaction time, temperature and equivalent of acid as describe in table 1.

TABLE 1

| Formic acid | Temperature (° C.) | 10 min | 30 min | 60 min | 90 min |
|---|---|---|---|---|---|
| 1 mol | 90 | CuO | CuO | $Cu_2O$ | Cu |
| 1 mol | 120 | CuO | $Cu_2O$ | Cu | Cu |
| 5 mol | 90 | CuO | $Cu_2O$ | Cu | Cu |
| 5 mol | 120 | $Cu_2O$ | Cu | Cu | Cu |
| 10 mol | 90 | $Cu_2O$ | Cu | Cu | Cu |
| 10 mol | 120 | Cu | Cu | Cu | Cu |

Also, the alkylamine can be mixed in a mole of 2 to 10 with respect to 1 mole of CuO micropowder. If the content of the alkylamine is less than 2 moles, the size of CuO nanoparticles cannot be sufficiently controlled. If the content of the alkylamine is more than 10 moles, $Cu_2O$ or Cu nanoparticles may not be produced.

Also, the alkylamine may be a primary amine including an aliphatic amine of carbon numbers 4 to 18, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, or octadecylamine, etc. but it is not limited to them.

In the producing CuO nanoparticles by mixing CuO micropowder and alkylamine in a nonpolar solvent and heating at 60-300° C., if the temperature is lower than 60° C., CuO nanoparticles cannot be formed from CuO micropowder. If the temperature is higher than 300° C., nanoparticles are formed too rapidly so that it causes agglomeration of nanoparticles.

In the producing copper-based particles by adding a capping molecule and a reducing agent to the CuO nanoparticles and heating, the capping molecule such as oleic acid may be mixed in a mole of 0.5 to 4 with respect to 1 mole of CuO micropowder. If the content of the capping molecule is less than 0.5 moles, the nanoparticle cannot have dispersibility, resulting in precipitation. If the content of the capping molecule is more than 4 moles, Cu-olate complex is formed so that it prevents formation of nanoparticles.

The reducing agent may be dimethylamine borane, terbutylamine borane, triethylamine borane, etc, preferably formate compounds such as formic acid, ammonium formate.

Also, the reducing agent may be mixed in a mole of 1 to 10 with respect to 1 mole of CuO micropowder. If the content of reducing agent is less than 1 mole, the effect of reducing agent is decreased so that productivity is lowered. If the content of reducing agent is more than 10 moles, it is not efficient since an excessive amount of the reducing agent is used.

The heating temperature may be 60° C. to 120° C. If the temperature is between 60° C. and 80° C., $Cu_2O$ is only prepared from CuO nanoparticles. If the temperature is between 80° C. and 120° C., the reaction proceeds through the production of $Cu_2O$ to the production of Cu so that both $Cu_2O$ and Cu nanoparticles can be prepared. If the temperature increases over 120° C., it is problem that the size of particles increases too rapidly so that bulk Cu of size over 100 nm is produced.

The nonpolar solvent may be toluene, hexane, cyclohexane, decane, dodecane, tetradecane, hexadecane, octadecane or octadecene, etc. The nonpolar solvent controls reaction temperature and is useful for dilution. The nonpolar solvent is mixed in a mole of 3 to 30 with respect to 1 mole of CuO micropowder. If the content of the nonpolar solvent is less than 3 moles, uniform reaction solution cannot be formed. If the content of the nonpolar solvent is more than 30 moles, it is not preferable since excessive nonpolar solvent is required.

When the copper-based nanoparticles are isolated, methanol or acetone or a mixture of methanol and acetone can be used but it is not limited to this.

The method for manufacturing copper-based nanoparticles was set forth above in detail, and hereinafter, explanations will be given in greater detail with specific examples. While the embodiment of the present invention provides the production of copper-based nanoparticles, the invention is not limited to the examples stated below and may be used for production of another copper-based nanoparticles. It is also apparent that more changes may be made by those skilled in the art without departing from the principles and spirit of the present invention.

Example 1

After CuO micropowder 1 mole was added to 1 L of toluene and 4 moles of octylamine was further added, the reaction solution was heated at 110° C. After 2 hours of the reaction, dark brown nanoparticles were washed with methanol to obtain CuO nanoparticles.

1 Moles of oleic acid and 5 moles of formic acid were added to 1 mole of the CuO nanoparticles and the reaction solution was heated to 110° C. As the temperature increases, $Cu_2O$ nanoparticles were produced, and at over 80° C. Cu nanoparticles were also produced.

The TEM image of CuO nanoparticles prepared in Example 1 was shown in FIG. 1. FIG. 1 ensures that uniform nanoparticles with a size less than 20 nm was generated.

Figure 2:
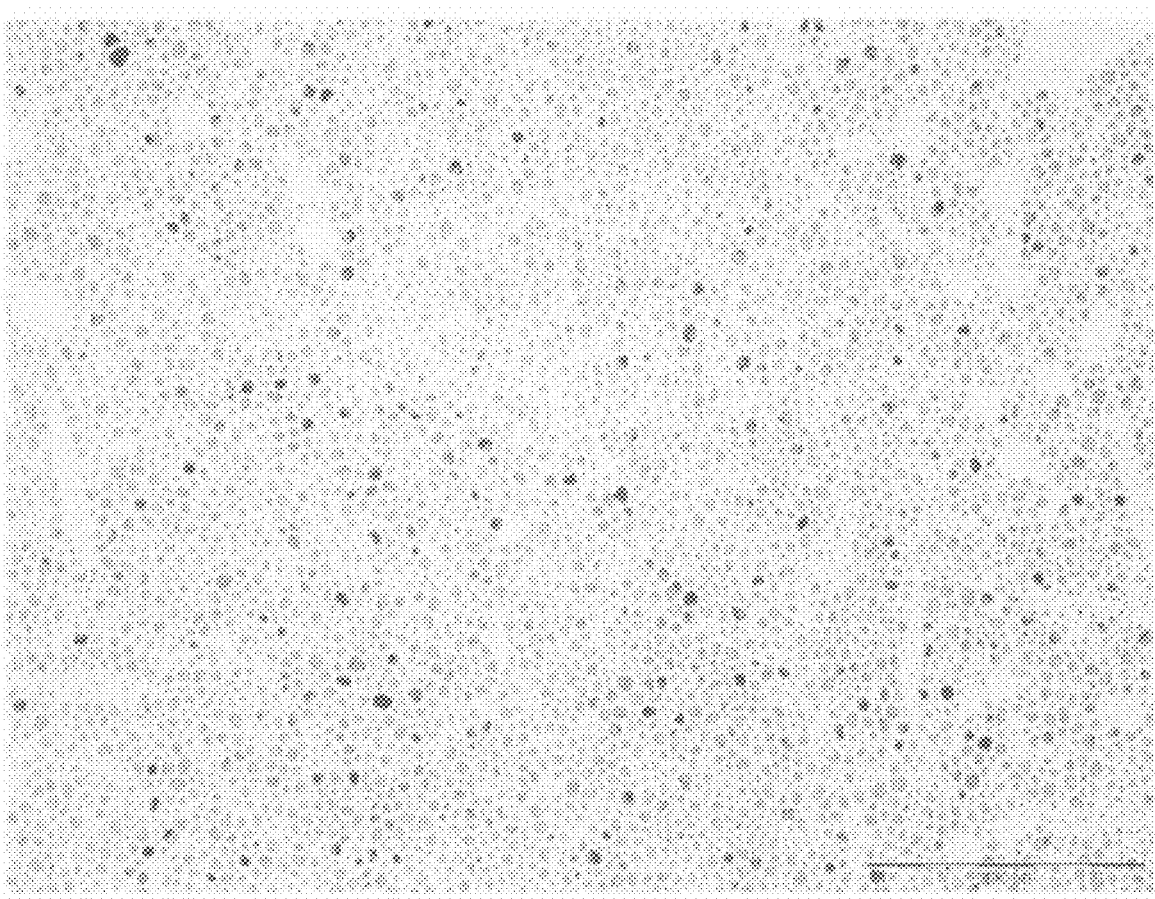
FIG. 2 is a TEM image of the Cu nanoparticles manufactured according to example 1 of the invention.

The TEM image of Cu nanoparticles prepared in Example 1 was shown in FIG. 2. The Cu nanoparticles showed very high dispersibility.

What is claimed is:

1. A method for manufacturing copper-based nanoparticles, the method comprising:
   producing CuO nanoparticles by mixing CuO micropowder and alkylamine in a nonpolar solvent and heating the mixture at 60-300° C.; and
   producing copper-based nanoparticles by mixing a capping molecule and a reducing agent with the CuO nanoparticles and heating the mixture at 60-120° C.,
   wherein the reducing agent is formic acid and the formic acid is mixed in a mole ratio of 1 to 10 with respect to 1 mole of the CuO micropowder.

2. The method of claim 1, wherein the copper-based nanoparticle is selected from a group consisting of $Cu_2O$, Cu and a mixture thereof.

3. The method of claim 1, further comprising isolation of the copper-based nanoparticle using methanol or acetone.

4. The method of claim 1, wherein the alkylamine is mixed in a mole ratio of 2 to 10 with respect to 1 mole of the CuO micropowder.

5. The method of claim 1, wherein the alkylamine is a primary amine.

6. The method of claim 5, wherein the primary amine is an alkylamine having carbon numbers of 4 to 18.

7. The method of claim 6, wherein the alkylamine having carbon numbers of 4 to 18 is at least one selected from the group consisting of butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine and octadecylamine.

8. The method of claim 1, wherein the capping molecule is mixed in a mole ratio of 0.5 to 4 with respect to 1 mole of the CuO micropowder.

9. The method of claim 1, wherein the capping molecule is oleic acid.

10. The method of claim 1, wherein the nonpolar solvent is at least one selected from the group consisting of toluene, hexane, cyclohexane, decane, dodecane, tetradecane, hexadecane, octadecane and octadecene.

11. The method of claim 1, wherein the nonpolar solvent is mixed in a mole ratio of 3 to 30 with respect to 1 mole of the CuO micropowder.

* * * * *